United States Patent [19]

Legler et al.

[11] Patent Number: 4,926,916
[45] Date of Patent: May 22, 1990

[54] BISCUIT JOINER

[75] Inventors: John G. Legler, Huber Heights; Harold E. Folkerth, Dayton; David D. Flora, Arcanum, all of Ohio

[73] Assignee: Shopsmith, Inc., Dayton, Ohio

[21] Appl. No.: 392,183

[22] Filed: Aug. 10, 1989

[51] Int. Cl.5 .............................. B27C 5/00; B27C 1/00
[52] U.S. Cl. ................................ 144/136 R; 144/1 C; 144/137; 144/371; 144/252 R
[58] Field of Search .................. 30/373, 374; 409/182; 144/134 R, 134 D, 136 R, 136 C, 137, 150, 371, 1 R, 1 C, 252 R, 252 A

[56] References Cited

U.S. PATENT DOCUMENTS 3,167,260  1/1965  Gibbons et al. ................. 144/252 R
4,615,654  10/1986  Shaw ................................ 144/136 C

FOREIGN PATENT DOCUMENTS 2838233  6/1979  Fed. Rep. of Germany ... 144/136 C

OTHER PUBLICATIONS

Popular Science—Feb. 1988—pp. 80 and 81.
Virutex—Ensambladora 0-81—pp. 1-15.
Virutex—brochure.

Primary Examiner—W. Donald Bray
Attorney, Agent, or Firm—Biebel, French & Nauman

[57] ABSTRACT

A biscuit joiner for cutting semi-elliptical slots in opposing edges of workpieces which are to be joined along those edges includes a housing adapted to be mounted upon the quill of a multi-purpose woodworking tool, which housing encloses a rotary saw blade adapted to be attached to a spindle projecting from the quill on which the housing is mounted. A spring loaded guide projects from the front face of the housing and has a slot therethrough, so that when the front face of the guide is engaged by an edge of a workpiece to be slotted the guide can be pushed inwardly against spring pressure, allowing the rotary saw blade to be exposed and form a slot in the edge of the workpiece. Adjustable stops are provided on the guide so that a desired depth of cut will automatically be made after adjustment.

6 Claims, 4 Drawing Sheets

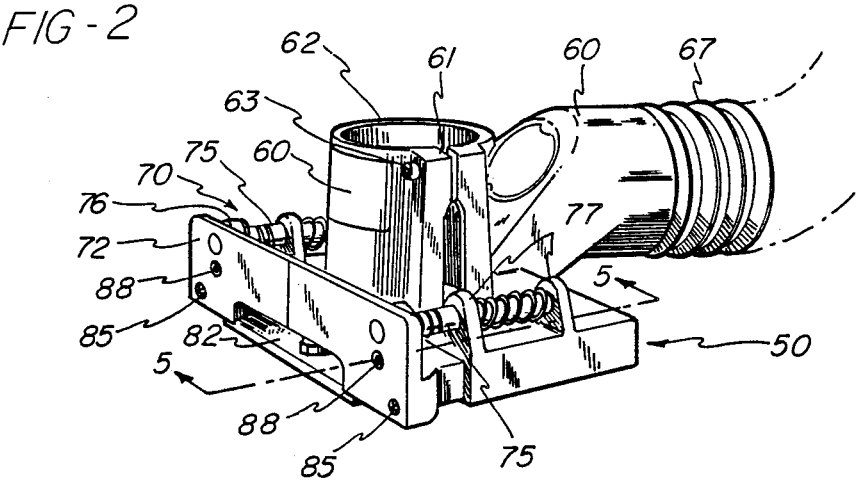
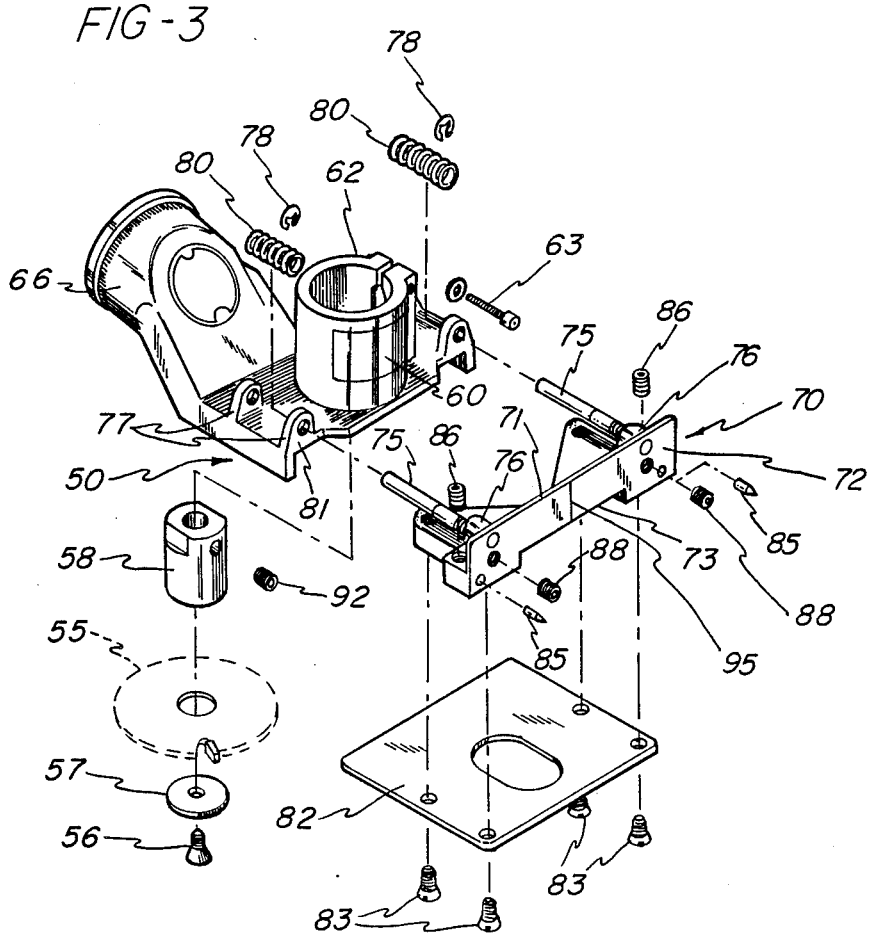

BISCUIT JOINER

BACKGROUND OF THE INVENTION

The art of woodworking has recently developed a new technique ("biscuit joining") for joining wood workpieces which offers substantial advantages over the previously conventional techniques such as gluing and doweling. In the practice of this technique, half-oval slots are cut by a rotary saw blade in the mating surfaces of two workpieces, and special oval biscuits are then glued into these slots. The biscuits themselves are formed of pressed wood fiber which swells in the presence of woodworking glue, and they literally lock the joined workpieces together much more strongly than if dowels and glue were used to form the joint.

A number of power tools are now commercially available for cutting the special slots in wood workpieces which are required for biscuit joining, and which also must be accurately located and dimensioned in order to produce a proper biscuit joint. Further, the biscuits for these purposes are presently commercially available in three sizes, which are selectively used in accordance with the sizes of the workpieces to be joined, and it is essential in every case that the slots be precisely matched in dimensions to the size of the biscuits to be inserted therein.

The power tools ("biscuit joiners") which are currently available for use in biscuit joining are self-contained portable units that include their own drive motor but must be used in conjunction with a suitable worktable. Also, they are relatively expensive, having list prices ranging from about $200 to more than $500, and they have been criticized in home workshop periodicals as cumbersome to use.

SUMMARY OF THE INVENTION

A primary object of the present invention is to provide a biscuit joiner which not only is simpler and less expensive than the tools for the same purpose previously available, but also to provide such a tool as an accessory for an existing power operated tool, such particularly as a multi-purpose woodworking tool of the type sold under the trademark SHOPSMITH, which includes a motor and power transmission system and a worktable, and which can be oriented to different positions in accordance with the operation to be performed thereon by a particular tool, such as a table saw, lathe, shaper, sander or drill.

The biscuit joiner of the present invention includes a main housing which encloses a rotary saw blade adapted to be directly connected to the drive spindle of a multi-purpose woodworking tool in the appropriately fixed relation with a worktable forming a part of the tool. A guide for the workpiece to be cut is mounted on the front of this housing in such manner that each workpiece can be held against and moved with this guide along the worktable of the power operated tool into position to be slotted by the saw. In addition, provision is made for adjusting the extent to which this guide can move toward the saw in order to establish the desired depth of each slot in accordance with the size of the biscuit to be inserted therein.

The invention offers an initial advantage over the presently available biscuit joiners, which include their own drive motors, in that the biscuit joiner of the invention is designed to be mounted on and driven by the drive of an existing power operated tool, and it can therefore be produced and sold for substantially less than the prior biscuit joiners.

Another advantage flows from the fact that because the drive, and specifically the drive spindle, in the power operated tools with which the biscuit joiner of the invention is used is located in a fixed position in the main frame of the tool, and provision is also made for establishing a fixed position of the worktable with respect to the drive spindle, the biscuit joiner of the invention is mechanically secured to the existing drive and is therefore supported thereby independently of the operator and the worktable. As a result, the user of the biscuit joiner of the invention will have both hands free to manipulate the workpiece into properly accurate relation with the axis of the rotary saw and then to hold the workpiece during the slotting operation, and the invention therefore promotes both the obtaining of highly accurate results and also the ease with which those results are obtained.

Other objects and advantages of the invention, and the means by which they are carried out and provided, will be apparent from or pointed out in the course of the description of the preferred embodiment of the invention which follows.

BRIEF DESCRIPTION OF THE DRAWINGS

FIG. 2 is a perspective view of a biscuit joiner constructed in accordance with the invention and mounted in operating position on the quill of the tool shown in FIG. 1;

FIG. 3 is an exploded perspective view of the biscuit joiner shown in FIG. 2;

DESCRIPTION OF THE PREFERRED EMBODIMENTS

Figure 1:
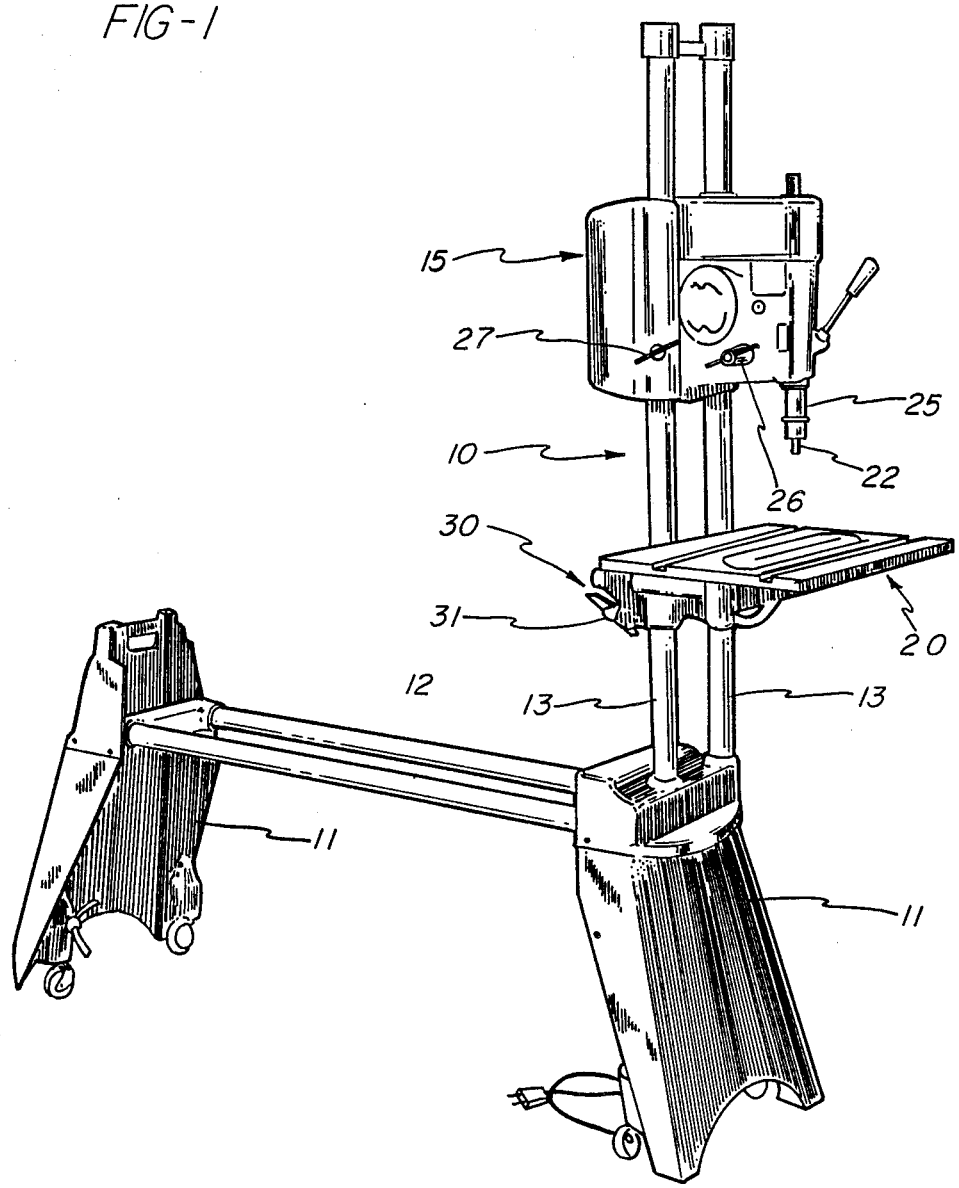
FIG. 1 is a perspective view illustrating a multi-purpose tool with which the biscuit joiner of the invention is designed to be used, the tool being shown in a drill press position.
Figure 4:
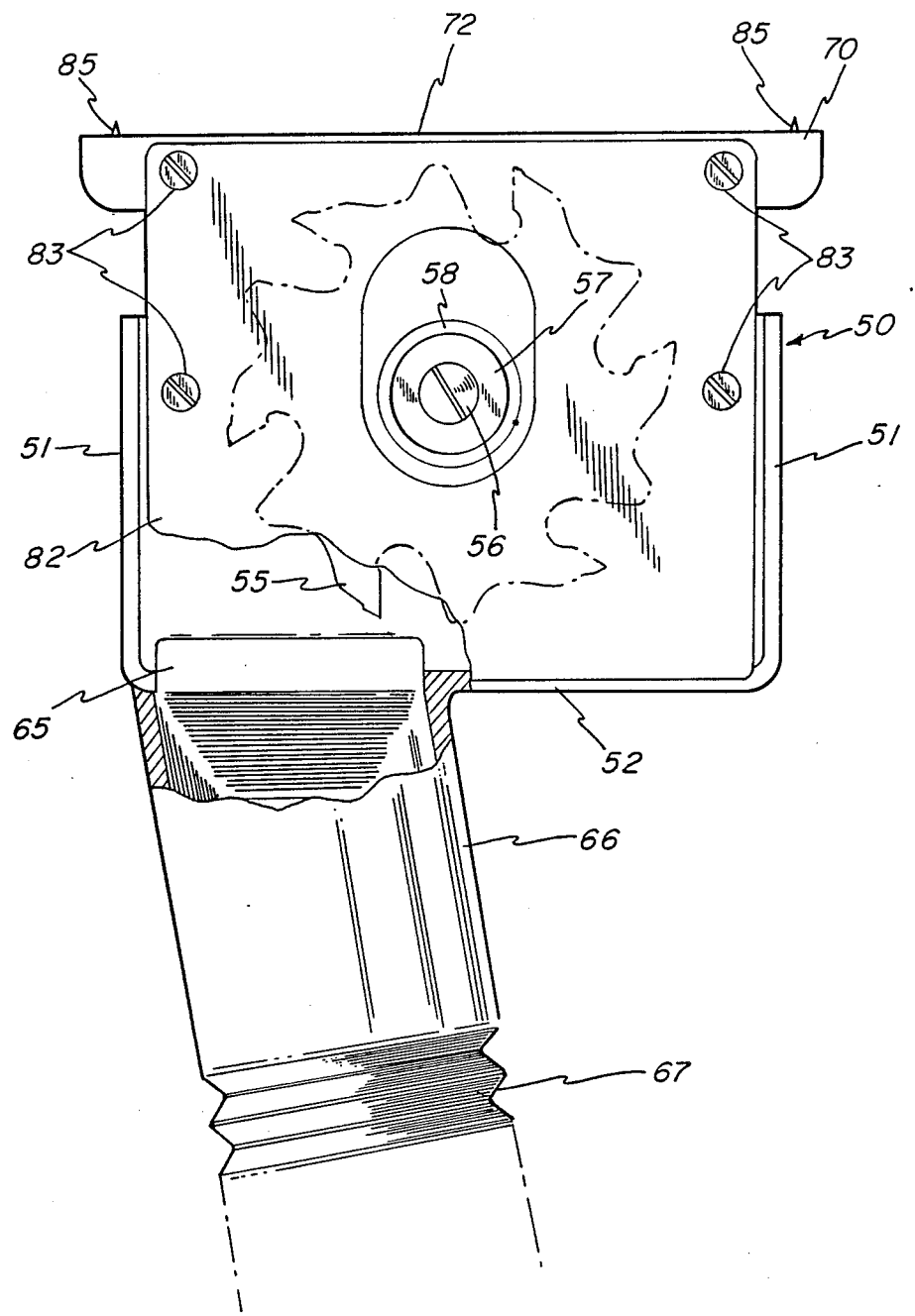
FIG. 4 is a view of the under side of the biscuit joiner shown in FIG. 2, with parts broken away.

FIG. 1 illustrates a multi-purpose tool 10 sold under the trademark SHOPSMITH MARK V which is generally of the construction shown in Bartlett et al U.S. Pat. No. 4,510,980, the disclosure of which is incorporated herein by reference. The tool 10 includes a pair of spaced legs 11 connected by a pair of bench tubes 12, and it also includes a pair of way tubes 13 that form the supports on which the headstock 15 and the worktable 20 are slidably mounted and to which they can be secured in any desired spaced relation. The way tubes 13 are mounted in one of the legs 11 for pivotal movement between a horizontal position and the vertical position shown in FIG. 1, which is the drill press position.

The headstock 15 encloses an electric drive motor and transmission for driving a main spindle 22 journalled in a quill 25 which does not rotate but can be extended and retracted axially with respect to the headstock and locked in any position within its range of travel, by means of the lock mechanism 26. A lock mechanism 27 on each side of the headstock 15 is effective to lock the headstock to the adjacent way tube 13.

The worktable 20 is supported on a carriage 30 which is also slidably mounted on the way tubes 13 and may be locked in any desired position thereon, by the lock mechanism indicated generally at 31. The worktable 20 is adjustably mounted on the carriage 30, described in Bartlett et al U.S. Pat. No. 4,566,510, the disclosure of which is incorporated herein by reference. The worktable 20 supports each of the workpieces to be slotted for biscuit joining as described in detail hereinafter.

Figure 6:
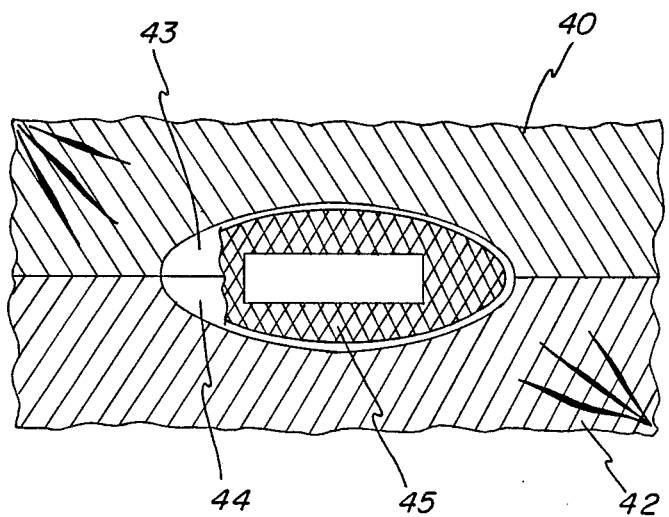
FIG. 6 is a fragmentary sectional view illustrating a typical biscuit joint produced by use of the biscuit joiner of the invention.

Referring initially to FIG. 6, this view illustrates a biscuit joint between two wood workpieces 40 and 42, each of which has a half-oval slot 43 and 44 in the edge surface thereof abutting the other workpiece. These two half slots are in turn filled by a biscuit 45, together with glue which is not shown, to complete the biscuit joint. The purpose of the tool of the present invention is to cut such slots 43 and 44 with accurately controlled dimensions in accordance with the size of biscuit 45 to be used, which biscuits are currently commercially available in three sizes ranging from 0.625 inch by 1.75 inches to 1 inch by 2.375 inches in width and length, and all approximately 0.125 inch in thickness.

Referring now to FIGS. 2-5, the tool of the invention includes a main housing 50 which is of generally rectangular outline as viewed from below and includes side walls 51 and a rear wall 52 enclosing a space for receiving a rotary saw blade 55. The saw blade 55 is secured by a screw 56 and washer 57 to the lower end of an arbor 58 which in use with the tool 10 is mounted on the drive shaft 22 and is freely rotatable within a tubular collar 60 that extends upwardly from the top of the housing 50. The collar 60 is split throughout most of its length to provide a slot 61 therethrough and a clamping portion 62 at the upper end thereof which is proportioned for clamped attachment on the quill 25 and includes a clamping cap screw 63.

The housing 50 is open along the front thereof so that the saw blade 55 can project therefrom. At the back of housing 50, there is a slot 65 communicating with a tubular extension 66 which should be connected to a suction tube 67 leading to a vacuum cleaner or other suction device for collecting chips and sawdust produced during operation of the biscuit joiner of the invention.

A guide 70 for holding each workpiece during slotting is mounted on the front of housing 50 for in and out movement with respect to the saw blade 55. The guide 70 includes a front wall 71 having a flat front face 72 against which the workpiece is pressed during slotting, and the wall 71 is provided with a slot 73 along its lower edge through which the saw blade can extend as the guide is moved inwardly of housing 50 in use.

The mounting for the guide 70 on housing 50 includes a rod 75 on each side of the housing, the forward end of each of these rods being secured in a bore in a boss portion 76 of the guide wall 71. Each rod 75 is freely slidable through a pair of spaced front and rear brackets 77 integrally formed on each side of the housing 50, and the forward limit position of the guide 70 is established by first stop means comprising a C-clip 78 received in a circumferential groove 79 on each rod 75 which stop means butts the inside of the associated front bracket 77 at each side of the front of housing 50. A coil spring 80 is mounted on each rod 75 between the associated brackets 77 to provide a constant biasing force urging the guide 70 to its outer limit position wherein the C-clips 78 butt the outer brackets 77, and the guide can be pressed toward housing 50 until its front wall butts the front face 81 of housing 50.

A guard 82 is mounted by screws 83 on the underside of the guide 70 so that it extends under and fully guards the saw blade 55. The guide 70 also carries a pair of adjustable pins 85 which project through and outwardly of the face 72 and are intended to penetrate each workpiece in order to hold it in laterally fixed relation with the face 72 during a slotting operation. The pins 85 are adjustably secured in desired projecting positions by set screws 86 in threaded bores in the front wall 71 of guide 70.

Special provision is made for establishing a separate inner limit position for the guide 70 for each size of biscuit for which a slot is to be cut, with these positions differing from each other in accordance with the width of each biscuit and therefore the depth of the slot to be cut. For this purpose, a set screw 88 is threaded through the front face 72 of guide 70 below each of the rods 75 so that it projects beyond the rear face of guide 70 in a position to abut the front face 81 of housing 50 to limit movement of the guide toward the front of housing 50.

Each rod 75 is provided with indicia consisting of three circumferential grooves 90 on the portion thereof which lies between the guide wall 71 and the forward one of each bracket 77 in which the rod is slidably supported. These grooves are so located and spaced that when the guide 70 is forced toward the housing 50 to the position wherein the first of these grooves 90 is in line with the front face 81 of the housing, that will be the proper inner limit position of the guide for cutting a slot 43 or 44 of the proper depth for a biscuit 45 of the minimum width. The second and third of the grooves 90 similarly establish the inner limit positions of the guide 70 for the middle size and largest size of biscuit, respectively.

At the start of an operation of biscuit joining, the operator must first establish the proper limit position for the guide 70 for the biscuits to be used. If, for example, it is the middle size, the operator will adjust the set screws 88 to such extent of projection inwardly from the guide 70, as shown in dotted lines in FIG. 5, that when the guide is pressed in until these set screws butt the front face of the housing 50, the middle groove 90 will be aligned with the front face of the housing.

Similar adjustments set limit positions for guide 70 for the smallest and largest sizes of biscuit. Since in each of these adjusted positions, the projecting end of each set screw 88 will be aligned vertically with the appropriate groove 90 in the adjacent rod 75, the set screws 88 can first be correspondingly adjusted as determined by eye. Accurate final adjustment to a position wherein alignment of the proper groove 90 with the front face 81 of the housing 50 is then optically easy to accomplish.

Figure 5:
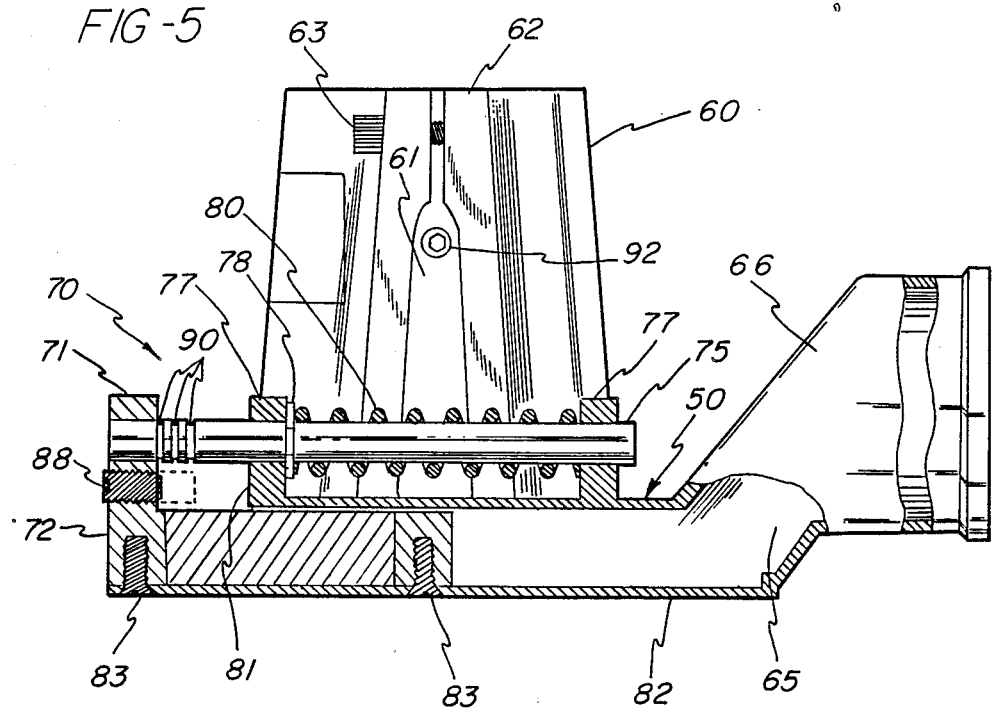
FIG. 5 is a section on the line 5—5 in FIG. 2.

As already noted, the biscuit joiner of the invention should be mounted on the headstock 15 of the tool 10 when the tool is in the vertical position shown in FIG. 1. This mounting operation requires that the arbor 58 first be mounted on the drive spindle 22, and this is done by sliding the arbor to the proper position on the spindle and then locking it thereto by means of a set screw 92 in the arbor, to which access is provided through the slot 61 in the collar 60 as shown in FIG. 5. After the arbor has thus been attached to the spindle 15, the collar 60 is slipped upwardly along the quill 25 to a stop conventionally provided on the quill, after which the screw 63 is tightened to secure the clamp portion 62 of collar 60 on the quill. The arbor and housing and the stops on the spindle and quill are so proportioned that the blade and housing are properly positioned with respect to each other when the arbor and housing are installed all the way to the stops on the spindle and quill.

The only remaining necessary adjustment is to set the relative positions of the headstock 15 and worktable 20 so that the height of the saw blade 55 above the worktable corresponds to the location where it is desired to slot each workpiece, and the tool is then ready for use. For optimum effectiveness, the top of each workpiece should first be marked to locate the center of the slot to be cut, and this mark is aligned with the line 95 on the face 71 of guide 72 which is in line with the axis of saw blade 55. After the workpiece is thus aligned on guide 70, and held in that position by the pins 85, the workpiece is forced into the path of the saw blade 55 by pressing the workpiece and guide 70 inwardly against the biasing force of the springs 80 until further movement of the guide is prevented by engagement of the set screws 88 with the front face 81 of the housing.

It will be apparent that while the biscuit joiner shown in the drawings has been described with specific reference to its use as an attachment for a multi-purpose tool, it is equally well adapted for use as an attachment to any drill press having its drive spindle journalled in a non-rotating quill or equivalent non-rotating sheath to which the housing 50 can be attached. In either case, the tool of the invention has a major practical advantage in that since its housing is secured to stationary drive means, and since there is also a worktable mounted in adjustably fixed relation with the drive means of either a multi-purpose tool or a drill press, the operator's hands are free to hold the workpiece in accurately located position on the guide face 72. In contrast with a portable tool containing its own motor, unless some means are available for temporarily securing the tool to a worktable, the operator may be forced to handle the tool with one hand and the workpiece with the other, which is a set of conditions making it considerably harder to obtain an accurately located slot.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. Apparatus for cutting slots in wood workpieces to be joined by disk-like biscuits of predetermined dimensions inserted in such slots, comprising:
   (a) a power tool including a frame and drive means mounted on said frame and having a drive spindle,
   (b) a worktable mounted on said frame for relative adjustment toward and away from said drive means,
   (c) a rotary saw blade drivingly connected with said spindle for rotation about a predetermined axis perpendicular to said worktable and fixed laterally with respect to said worktable,
   (d) a housing mounted on said drive means in enclosing relation with said saw blade and open at the front thereof,
   (e) said housing and said saw blade being so proportioned that in said mounted positions thereof on said drive means, said saw blade projects through said open front of said housing,
   (f) means for effecting relative adjustment of said drive means and said worktable parallel with said axis to establish a predetermined space between said saw blade and said worktable,
   (g) a guide for workpieces to be slotted having a face for engagement by each such workpiece,
   (h) means mounted said guide on said housing at said open front thereof for linear movement toward and away from said saw blade,
   (i) said guide having a slot therethrough aligned with and for receiving said saw blade therethrough,
   (j) stop means establishing an outer limit position of said guide wherein said saw blade does not project beyond the plane of said guide face, and
   (k) stop means for establishing an inner limit position of said guide establishing the maximum depth of the slot but by said saw blade in a workpiece moved on said worktable with said guide to said inner limit position;
   (l) whereby upon movement of said guide toward said housing by a workpiece listing on said worktable in engagement with said guide, said saw blade will cut a slot in said workpiece at the level determined by said means for effecting relative adjustment of said drive means and said worktable.

2. Apparatus as defined in claim 1 wherein said guide mounting means comprises a pair of rods each having one end thereof secured to said guide, and means on said housing supporting said rods for sliding movement with respect to said housing, and wherein said means establishing an outer limit position of said guide comprises first stop means limiting the sliding movement of said rods outwardly of said housing, and further comprising means biasing said guide to said outer limit position thereof.

3. Apparatus as defined in claim 1 wherein said means establishing an inner limit position of said guide comprises stop means carried by said guide and adapted to project therefrom into abutting contact with said housing, and means for adjusting said stop means to project a selected distance from said guide establishing a limit position of said guide intermediate said inner and outer limit positions thereof.

4. Apparatus as defined in claim 2 wherein said means establishing an inner limit position of said guide comprises second stop means carried by said guide and adapted to project therefrom into abutting contact with said housing, and means for adjusting said second stop means to project a selected distance from said guide establishing a limit position of said guide intermediate said inner and outer limit positions thereof.

5. Apparatus as defined in claim 4 wherein said second stop means comprises a member mounted for threaded adjustment in said guide adjacent at least one of said rods, and further comprising indicia on said one rod for designating each of a plurality of adjusted positions of said second stop means.

6. Apparatus as defined in claim 1 wherein said drive means comprises a drive spindle supported in a non-rotating quill, and wherein said housing is mounted on said drive means by a non-rotating collar on said housing and means for securing said collar to said quill.

* * * * *